United States Patent
Khatwani et al.

(10) Patent No.: US 7,685,514 B1
(45) Date of Patent: Mar. 23, 2010

(54) METHOD AND SYSTEM FOR INCORPORATION OF GRAPHICAL PRINT TECHNIQUES IN A WEB BROWSER

(75) Inventors: Umesh Gopaldas Khatwani, Austin, TX (US); Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/579,256

(22) Filed: May 25, 2000

(51) Int. Cl.
*G06F 15/00* (2006.01)
*G06F 17/00* (2006.01)

(52) U.S. Cl. ................ 715/251; 715/243; 715/253; 715/269

(58) Field of Classification Search ............ 715/531, 715/530, 526, 527, 542, 200, 243, 253, 269
See application file for complete search history.

(56) References Cited

U.S. PATENT DOCUMENTS

| | | | |
|---|---|---|---|
| 4,709,348 A | 11/1987 | Horn et al. | 364/900 |
| 5,023,811 A | 6/1991 | Donnelly et al. | 364/518 |
| 5,528,742 A | 6/1996 | Moore et al. | 395/145 |
| 5,537,518 A | 7/1996 | Hasegawa | 395/117 |
| 5,613,017 A | 3/1997 | Roa et al. | 382/174 |
| 5,623,681 A | 4/1997 | Rivette et al. | 395/788 |
| 5,870,767 A | 2/1999 | Kraft, IV | 707/501 |
| 5,890,173 A | 3/1999 | Yoda | 707/501 |
| 5,950,214 A | 9/1999 | Rivette et al. | 707/512 |
| 6,011,905 A * | 1/2000 | Huttenlocher et al. | 358/1.2 |
| 6,016,494 A | 1/2000 | Isensee et al. | 707/102 |
| 6,018,749 A | 1/2000 | Rivette et al. | 707/525 |

(Continued)

FOREIGN PATENT DOCUMENTS

JP     2000-020384     1/2000

(Continued)

OTHER PUBLICATIONS

Stieren, "SST: Using Single-Sourcing, SGML, and Teamwork for Documentation", Proceedings of the 17th Annual International Conference on Computer Documentation, published by ACM Press, 1999, pp. 45-52.*

(Continued)

*Primary Examiner*—William L Bashore
(74) *Attorney, Agent, or Firm*—Yee & Associates, P.C.; Jeffrey S. LaBaw

(57) ABSTRACT

A web browser application program provides graphical print techniques, which allow the user to control how a web page is presented. The data processing system, under instruction of a program, responds to an instruction by the user to present a selected portion of a first document by creating a new document from the first document including the header, trailer, and the selected portion. The data processing system responds to an instruction by the user to change the font size of a selected portion of the first document by creating a copy of the first document and modifying or inserting font tags within the copy of the document. The data processing system responds to an instruction by the user to present the first document with page break indicators by creating a copy of the first document and inserting page break indicators within the copy to be presented to the user. The graphical print techniques may also be used together.

61 Claims, 16 Drawing Sheets

U.S. PATENT DOCUMENTS

| | | | |
|---|---|---|---|
| 6,029,182 A * | 2/2000 | Nehab et al. | 715/523 |
| 6,128,633 A * | 10/2000 | Michelman et al. | 715/525 |
| 6,185,588 B1 * | 2/2001 | Olson-Williams et al. | 715/236 |
| 6,330,577 B1 * | 12/2001 | Kim | 715/542 |
| 6,366,923 B1 * | 4/2002 | Lenk et al. | 707/104.1 |
| 6,457,030 B1 * | 9/2002 | Adams et al. | 715/239 |
| 6,487,567 B1 * | 11/2002 | Michelman et al. | 715/525 |
| 6,512,531 B1 * | 1/2003 | Gartland | 345/854 |
| 6,535,896 B2 * | 3/2003 | Britton et al. | 715/523 |
| 6,563,913 B1 * | 5/2003 | Kaghazian | 379/93.24 |
| 6,763,388 B1 * | 7/2004 | Tsimelzon | 709/228 |
| 6,832,351 B1 * | 12/2004 | Batres | 715/505 |
| 2002/0013792 A1 * | 1/2002 | Imielinski et al. | 707/523 |

FOREIGN PATENT DOCUMENTS

| | | |
|---|---|---|
| KR | 1998-0010862 | 4/1998 |
| KR | 1998-083539 | 12/1998 |

OTHER PUBLICATIONS

Imielinski (U.S. Appl. No. 60/173,757, filed Dec. 30, 1999), U.S. Patent and Trademark Office, Public PAIR.*

Page Frame Feature for Printing Electronic Documents; International Business Machines Research Disclosure; May 1999, pp. 688-690.

* cited by examiner

DOCUMENT HISTORY
602

```
<HTML>
<HEAD>
<TITLE>Sample Document</TITLE>   }606
</HEAD>
<BODY TEXT="#000000" LINK="#0000ff" VLINK="#800080">
<!--Begin Ads-->
<CENTER><A HREF="http://address"><IMG SRC="My Pictures/
banner.jpg"></A></CENTER>
<!--End Ads-->
<B><FONT FACE="Garamond" SIZE=7><P>Sample Web Document</P>
</B></FONT><FONT FACE="Garamond"><P>This is a sample HTML
document to help illustrate the various aspects of the
present invention.</P></FONT>
<FONT FACE="Garamond" SIZE=4><P>The three major aspects are
as follows:</P></FONT>
<P><IMG SRC="Image1.jpg" ALIGN="center" WIDTH=45
HEIGHT=45><FONT FACE="Garamond" SIZE=4> Able to print
portions of a web document e.g. highlighted text.</P></FONT>
<P><IMG SRC="Image2.jpg" ALIGN="left" WIDTH=45
HEIGHT=45><FONT FACE="Garamond" SIZE=4> Provide
scalability allowing for portions of a web document to be
adjusted for smaller or bigger sizes.</P></FONT>
<P><IMG SRC="Image3.jpg" ALIGN="center" WIDTH=45
HEIGHT=45><FONT FACE="Garamond" SIZE=4> Display a
virtual page break indicator inline with the web
documents.</P></FONT>
<P><IMG SRC="large.jpg"></CENTER></P>
<B><FONT FACE="Arial" SIZE=2><P>Aspect 1 | Aspect 2 | Aspect
3</P></B></FONT>
</BODY>
</HTML>
```
}608

604
CURRENT DOCUMENT

*FIG. 6*

DOCUMENT HISTORY

```
<HTML>
<HEAD>
<TITLE>Sample Document</TITLE>
</HEAD>
<BODY TEXT="#000000" LINK="#0000ff" VLINK="#800080">
<!--Begin Ads-->
<CENTER><A HREF="http://address"><IMG SRC="My Pictures/
banner.jpg"></A></CENTER>         1306
<!--End Ads-->
<B><FONT FACE="Garamond" SIZE=5><P>Sample Web
Document</P>
</B></FONT><FONT FACE="Garamond"><P>This is a sample HTML
document to help illustrate the various aspects of the
present invention.</P></FONT>
<FONT FACE="Garamond" SIZE=4><P>The three major aspects are
as follows:</P></FONT>
<P><IMG SRC="Image1.jpg" ALIGN="center" WIDTH=45
HEIGHT=45><FONT FACE="Garamond" SIZE=4> Able to print
portions of a web document e.g. highlighted text.</P></FONT>
<P><IMG SRC="Image2.jpg" ALIGN="left" WIDTH=45
HEIGHT=45><FONT FACE="Garamond" SIZE=4> Provide
scalability allowing for portions of a web document to be
adjusted for smaller or bigger sizes.</P></FONT>
<P><IMG SRC="Image3.jpg" ALIGN="center" WIDTH=45
HEIGHT=45><FONT FACE="Garamond" SIZE=4> Display a
virtual page break indicator inline with the web
documents.</P></FONT>
<P><IMG SRC="large.jpg"></CENTER></P>
<B><FONT FACE="Arial" SIZE=2><P>Aspect 1 | Aspect 2 | Aspect
3</P></B></FONT>
</BODY>
</HTML>
```

1304
CURRENT DOCUMENT

*FIG. 13*

DOCUMENT HISTORY

```
<HTML>
<HEAD>
<TITLE>Sample Document</TITLE>
</HEAD>
<BODY TEXT="#000000" LINK="#0000ff" VLINK="#800080">
<!--Begin Ads-->
<CENTER><A HREF="http://address"><IMG SRC="My Pictures/
banner.jpg"></A></CENTER>
<!--End Ads-->
<B><FONT FACE="Garamond" SIZE=7><P>Sample Web Document</P>
</B></FONT><FONT FACE="Garamond"><P>This is a sample HTML
document to help illustrate the various aspects of the
present invention.</P></FONT>
<FONT FACE="Garamond" SIZE=4><P>The three major aspects are
as follows:</P></FONT>
<P><IMG SRC="Image1.jpg" ALIGN="center" WIDTH=45
HEIGHT=45><FONT FACE="Garamond" SIZE=4> Able to print
portions of a web document e.g. highlighted text.</P></FONT>
<P><IMG SRC="Image2.jpg" ALIGN="left" WIDTH=45
HEIGHT=45><FONT FACE="Garamond" SIZE=4> Provide
scalability allowing for portions of a web document to be
adjusted for smaller or bigger sizes.</P></FONT>
<P><IMG SRC="Image3.jpg" ALIGN="center" WIDTH=45
HEIGHT=45><FONT FACE="Garamond" SIZE=4> Display a
virtual page break indicator inline with the web
documents.</P></FONT>
<P><IMG SRC="large.jpg"></CENTER></P>
<!--Begin Page Break-->
<CENTER><PRE>----------Page Break--
--------</PRE>
</CENTER>
<!--End Page Break-->
<B><FONT FACE="Arial" SIZE=2><P>Aspect 1 | Aspect 2 | Aspect
3</P></B></FONT>
</BODY>
</HTML>
```

} 1606

1604
CURRENT DOCUMENT

*FIG. 16*

METHOD AND SYSTEM FOR INCORPORATION OF GRAPHICAL PRINT TECHNIQUES IN A WEB BROWSER

BACKGROUND OF THE INVENTION

1. Technical Field

The present invention relates to an improved data processing system and, in particular, to a method and apparatus for managing world wide web documents in a data processing system. Still more particularly, the present invention provides a method and apparatus for performing actions on selected portions of web documents and displaying the location of page breaks within a web browser in a data processing system.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." These web pages are versatile and customized by authors. For example, web pages may mix text and graphic images. A web page also may include fonts of varying sizes. A browser is a program that is executed on a graphical user interface (GUI). The browser allows a user to seamlessly load documents from the Internet and display them by means of the GUI. These documents are commonly formatted using markup language protocols, such as hypertext markup language (HTML). Portions of text and images within a document are delimited by indicators, which affect the format for display. In HTML documents, the indicators are referred to as tags. The browser gives some means of viewing the contents of web pages (or nodes) and of navigating from one web page to another.

The versatility and customization of web pages, however, is sometimes an impediment to user generating hard copies of the documents. Popular web browsers let users print entire HTML documents. Often, web pages contain information that the user may not want in a printed copy of the document, such as advertising banners or large pictures. Web pages may contain text, which is the same color as the background and contains keywords to improve the chances of being returned to users by a search engine.

Currently, web browsers provide the ability to select a portion of a document and to print only the selected portion. However, the layout of a web page is relative to the locations of the indicators (i.e. tags) within the page. When only a portion is selected for print, how the layout is affected is not known until the portion is actually printed. For example, if a user selects a portion of a document containing images, the user does not know how the image will fall within surrounding text until the portion is printed. To view how a selected portion of a document will look when only that portion is printed, a user must edit the document in a two step process. First, the user must cut the highlighted portion and paste it into a word processor or HTML editor. Then, the pasted portion is printed from the word processor.

Another difficulty in generating hard copies occurs with varying font sizes within a web page. Often, web pages contain text, which may be too big or too small to be printed practically.

For example, an author might make some text very large to capture the attention of the viewer. Web pages may contain disclaimers, the text of which is too small to be printed legibly. Currently, web browsers do not provide the ability to select portions of a document and to increase or decrease the font size of the selected portions. Again, to do such, a user must copy the web page to or open the web page in a word processor or HTML editor, select portions of the text by highlighting, change the font properties of the highlighted portions, and print the document from the word processor.

Web pages are authored for the purpose of display. As such, a single web page may correspond to several printed pages. This feature is frustrating when a user tries to generate a hard copy of a web page. The number of pages that will be printed and where the page breaks will fall cannot be determined until the document is actually printed. A user may unwittingly print a document, which contains far more pages than desired. Some web browsers include a "print preview" function, which displays an image of how each page will appear when printed. However, the images are often difficult to read and it is difficult to determine the subject matter on each page. The user must use "zoom" functions and navigate through the images to identify the layout of the pages. The prior art "print preview" function does not allow the user to view page break indicators within a web document as it is displayed by the web browser.

SUMMARY OF THE INVENTION

The present invention solves the problems associated with the prior art by creating a copy of the requested document and automatically performing minor editing functions on the copy in response to user commands. According to a first aspect of the present invention, when a user selects a portion of a first web document by highlighting the portion on the display and entering or selecting a command to print the selected portion, the web browser application creates a second web document comprising the header of the currently displayed document and the selected portion of the document. The web browser application then prints the second document. In doing so, the selected portion is printed and the important structural data of the HTML document is retained.

According to a second aspect of the present invention, when a user selects a portion of a first web document by highlighting the portion of the display and entering or selecting a command to change the font, the web browser application creates a copy of the current web document and inserts virtual font tags before and after the selected portion. In doing so, the user may alter the appearance of the web page using a simple command without opening and operating a complex word processing or editing application program.

According to a third aspect of the present invention, when a document is displayed, the web browser application identifies page break information. The web browser application then creates a copy of the web document and inserts virtual page break tags at the locations indicated by the page break information. It is then the copy of the document that is displayed with the page break locations indicated on the display.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a document history and a current document to be processed by the present invention;

FIG. 13 depicts a document history and a current document having a modified font attribute for a selected portion of a document in accordance with a preferred embodiment of the present invention;

FIG. 16 depicts a document history and a current document including a page break indicator in accordance with a preferred embodiment of the present invention;

DETAILED DESCRIPTION OF THE PREFERRED EMBODIMENT

Figure 1:
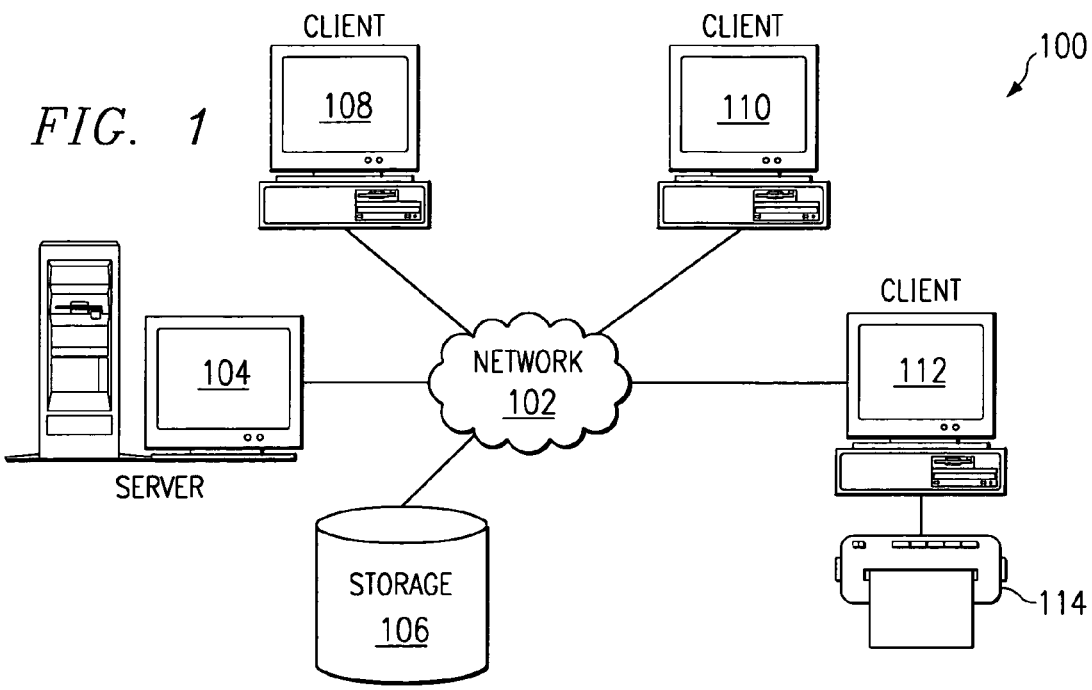
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. Client 112 is shown to be connected to printer 114. For purposes of this application, a network computer is any computer, coupled to a network, which receives a program or other application from another computer coupled to the network. In the depicted example, server 104 provides data, such as web pages to clients 108-112. The web pages may be stored in storage unit 106 or at the server 104. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
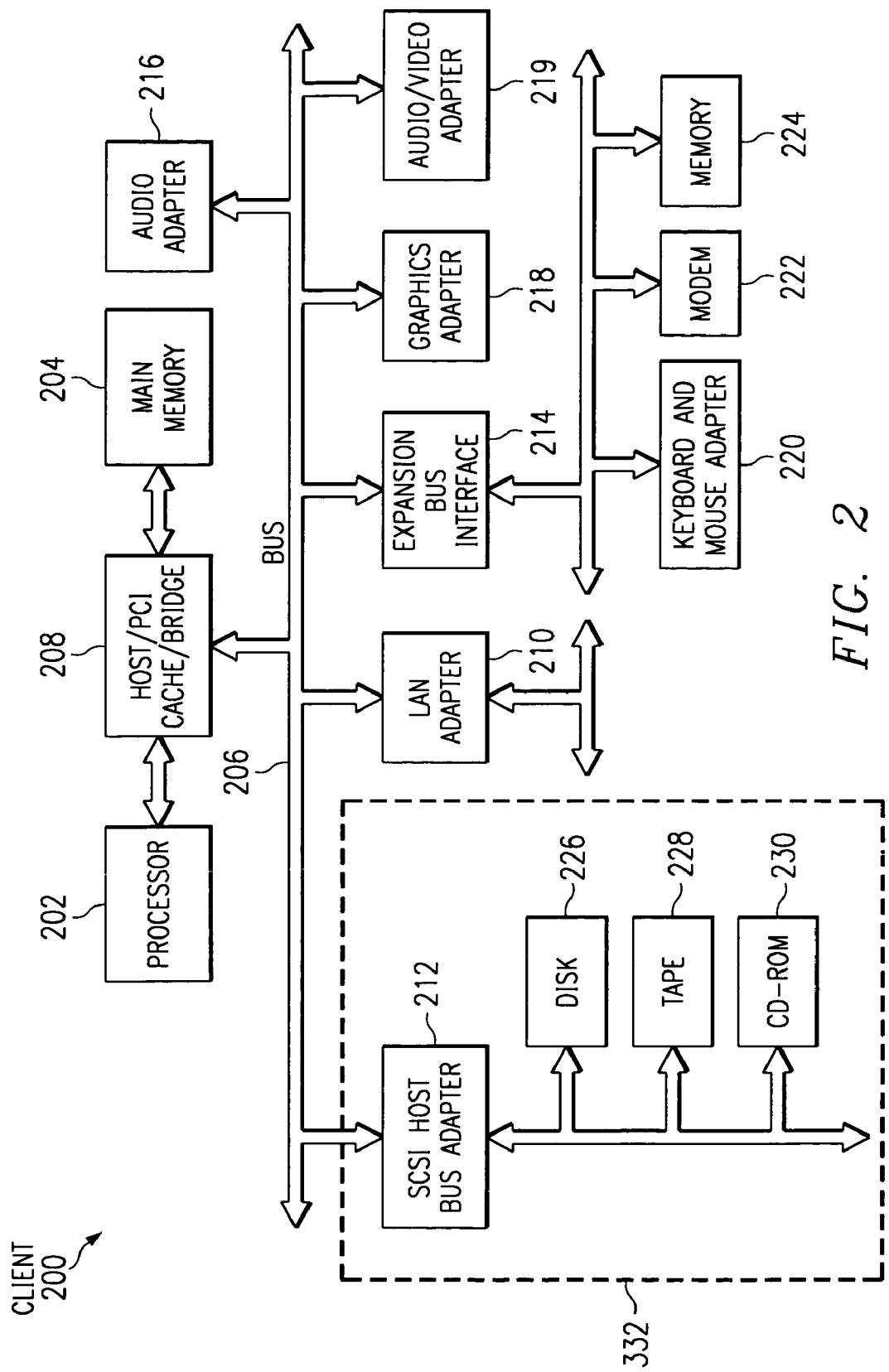
FIG. 2 is a block diagram illustrating a data processing system in which the present invention may be implemented.

With reference now to FIG. 2, a block diagram is shown illustrating a data processing system in which the present invention may be implemented. Data processing system 200 is an example of a client computer. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as Windows 2000, which is available from Microsoft Corporation. An object oriented programming system such as Java may run in conjunction with the operating system and provides calls to the operating system from Java programs or applications executing on data processing system 200. "Java"

is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device, which is configured with ROM and/or flash ROM in order to provide non-volatile memory for storing operating system files and/or user-generated data.

The depicted example in FIG. 2 and examples described herein are not meant to imply architectural limitations. For example, data processing system 200 also may be a notebook computer or hand held computer in addition to taking the form of a PDA. Data processing system 200 also may be a kiosk or a Web appliance.

Figure 3:
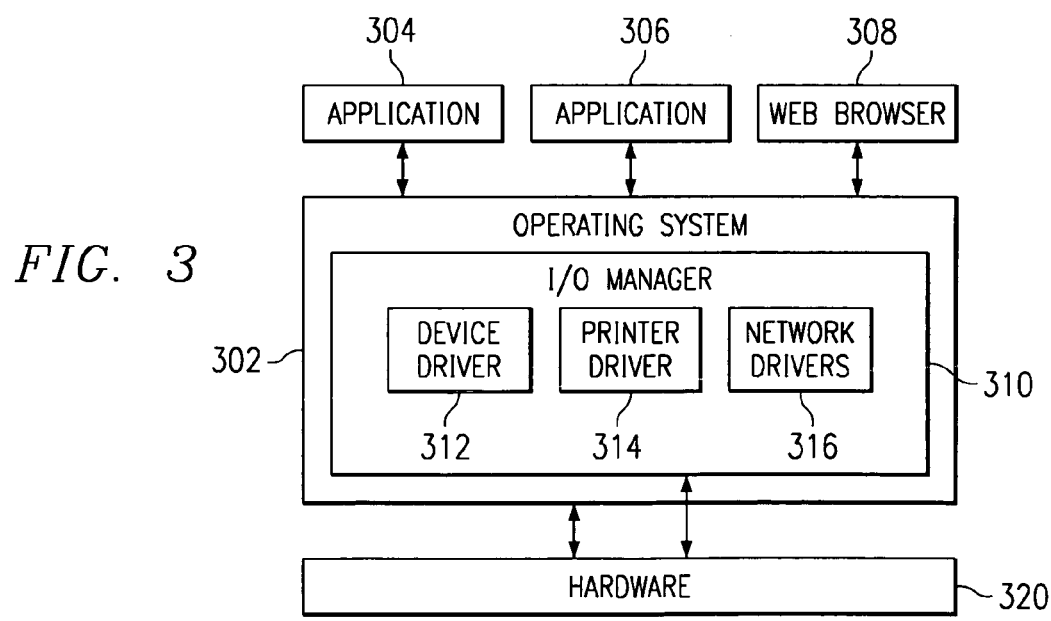
FIG. 3 is a block diagram illustrating the software organization within the data processing system of the present invention.

With reference now to FIG. 3, a block diagram is shown illustrating the software organization within the data processing system in which the present invention may be implemented. The organization shown may be embodied within data processing system 200 as an example of a client computer. Operating system 302 communicates with applications 304, 306 and web browser 308. Operating system communicates with hardware 320 directly or through input/output (I/O) manager 310. I/O manager 310 includes device driver 312, printer driver 314, and network drivers 316. Device driver 312 may be a software driver for a printer or other device, such as a display, fax modem, sound card, etc. The operating system receives input from the user through hardware 320. Web browser 308 sends information to and receives information from the Internet by communicating with network drivers 316 through I/O manager 310. Applications, including web browser 308, send documents to a printer, such as printer 114, through printer driver 314.

Figure 4:
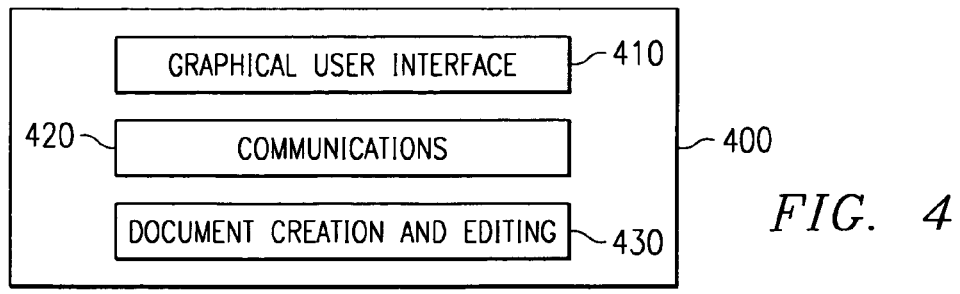
FIG. 4 is a block diagram of a browser program structure in accordance with a preferred embodiment of the present invention.

Turning next to FIG. 4, a block diagram of a browser program 400 is depicted in accordance with a preferred embodiment of the present invention. A browser is an application used to navigate or view information or data in a distributed database, such as the Internet or the World Wide Web. The browser may be located on storage devices, such as hard disk drive 226, and may be loaded into main memory 204 for execution by processor 202, in FIG. 2. Furthermore, browser 400 may be implemented as browser 308 in FIG. 3.

In this example, browser 400 includes a user interface 410, which is a graphical user interface (GUI) that allows the user to interface or communicate with browser 400. This interface provides for selection of various functions through menus and allows for. For example, a menu may allow a user to perform various functions, such as saving a file, opening a new window, displaying a history, and entering a uniform resource locator (URL). Navigation allows for a user to navigate various pages and to select web sites for viewing. For example, navigation may allow a user to see a previous page or a subsequent page relative to the present page Communications 420 is the mechanism with which browser 400 receives documents and other resources from a network such as the Internet. Further, communications 420 is used to send or upload documents and resources onto a network. In the depicted example, communication 420 uses HTTP. Other protocols may be used depending on the implementation.

Browser 400 also includes document creation and editing 430. In response to instruction by the user, document creation and editing 430 creates a new document for presentation to the user. The specific features of presentation of a selected portion of a document, presentation of a document with modified font attribute for a selected portion, and presentation of a document with page break indicators will be described in more detail below. However, document creation and editing 430 may include other features which allow a user to customized an existing web page.

Browser 400 is presented as an example of a browser program in which the present invention may be embodied. Browser 400 is not meant to imply architectural limitations to the present invention. Presently available browsers may include additional functions not shown or may omit functions shown in browser 400. A browser may be any application that is used to search for and display content on a distributed data processing system. Browser 400 make be implemented using known browser applications, such as Netscape Navigator or Microsoft Internet Explorer. Netscape Navigator is available from Netscape Communications Corporation while Microsoft Internet Explorer is available from Microsoft Corporation, Redmond, Wash.

The present invention may be implemented by modifying the code of an existing web browser or by means of a plug-in application or other applications to be used integrally within the web browser. Known plug-in applications and other applications are configured within the web browser by creating associations with particular file types or by creating additional menu commands, buttons on toolbars, etc. Calls are made to the applications by the web browser and the applications are run within the browser itself. For example, images, streaming audio and video, and other content such as streaming stock quotes may be presented within the web browser by supporting applications.

Figure 5:
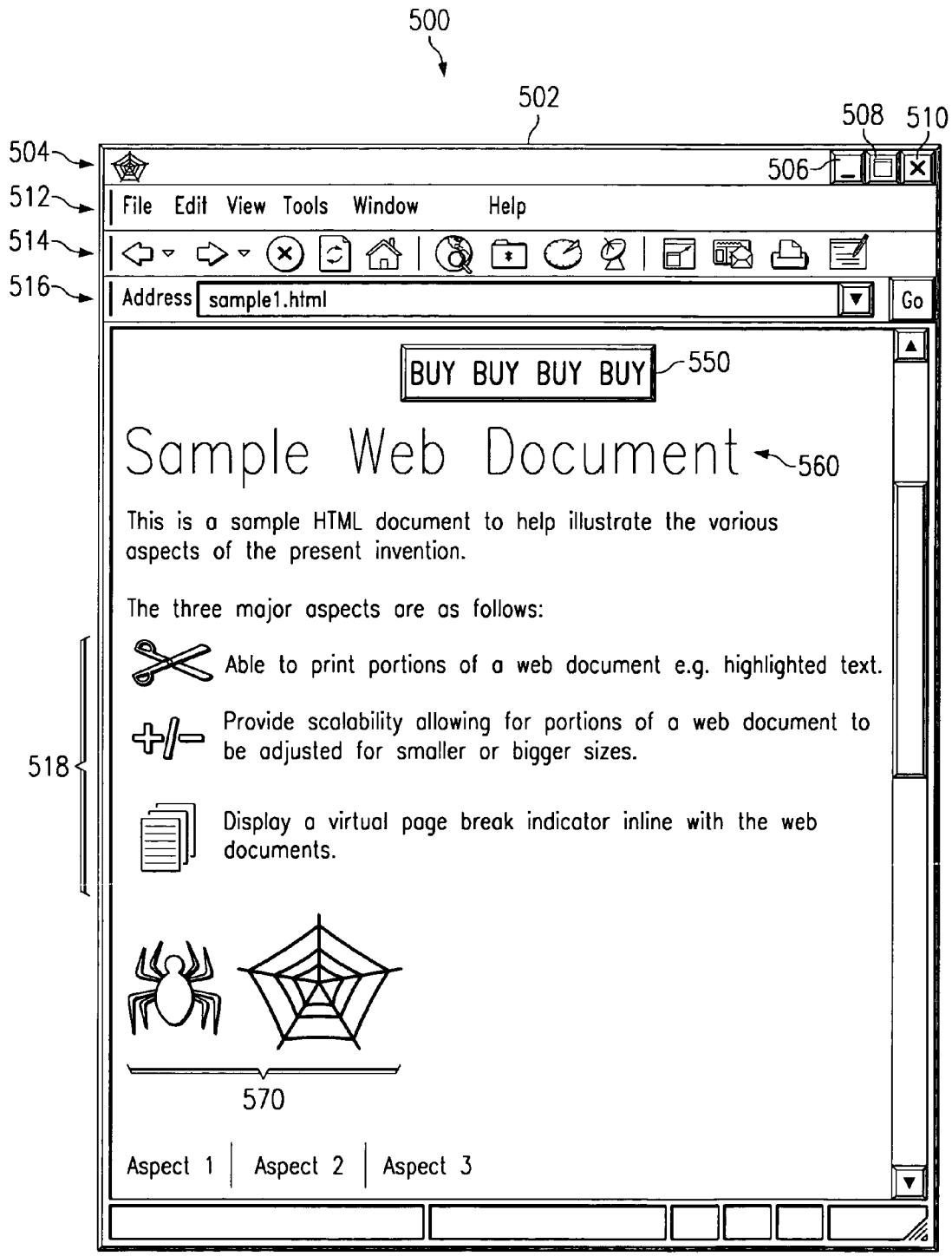
FIG. 5 is an example screen of display of a browser program in which the present invention may be implemented.

An example of a screen of display of a web browser is shown in FIG. 5. The screen comprises window 500, including a title bar 502, which may display the title of the document and the name of the browser program. Title bar 502 also includes a control box 504, which produces a drop-down menu when selected with the mouse, and "minimize" 506, "maximize" or "restore" 508, and "close" 510 buttons. The "minimize" and "maximize" or "restore" buttons 506 and 508 determine the manner in which the program window is displayed. In this example, the "close" button 510 produces an "exit" command when selected. The drop-down menu produced by selecting control box 504 includes commands corresponding to "minimize," "maximize" or "restore," and "close" buttons, as well as "move" and "resize" commands.

Browser program window 500 also includes a menu bar 512, navigation toolbar 514, and address toolbar 516. Menus to be selected from menu bar 512 include "File", "Edit", "View", "Tools", "Window", and "Help." However, menu bar 512 may include fewer or more menus, as understood by a person of ordinary skill in the art. Navigation toolbar 514 is a series of buttons, which produce navigational commands when selected. The navigation toolbar buttons include "Back", "Forward", "Stop", "Reload", and "Home." Address toolbar 516 includes a text entry field in which a new URL may be entered for retrieval. Browser program window 500 also includes a display area 518.

Also shown in FIG. 5 is an example HTML document displayed in display area 518. The example document includes an advertising banner 550, a string of text with a large font size 560, and an image 570. The operation of the present invention will be described with respect to the example document; however, it will be understood that the present invention may be implemented on any markup language document.

As shown in FIG. 6, the browser navigates within document history 602, which includes current document 604. The current document 604, which is displayed in FIG. 5, is an HTML document. Current document 604 is delimited by tags <HTML> and </HTML>. Document 604 also includes a header 606, delimited by tags <HEAD> and </HEAD>, and a body 608, delimited by tags <BODY> and </BODY>. The header includes a title, delimited by tags <TITLE> and </TITLE>, which is shown in title bar 502 in FIG. 5. The body makes up the displayable document shown in display area 518 in FIG. 5. The HTML document described herein is exemplary. A person of ordinary skill in the art would recognize that the present invention may be implemented or modified to process other known HTML tags and structures, such as tables and java scripts.

Figure 7A:
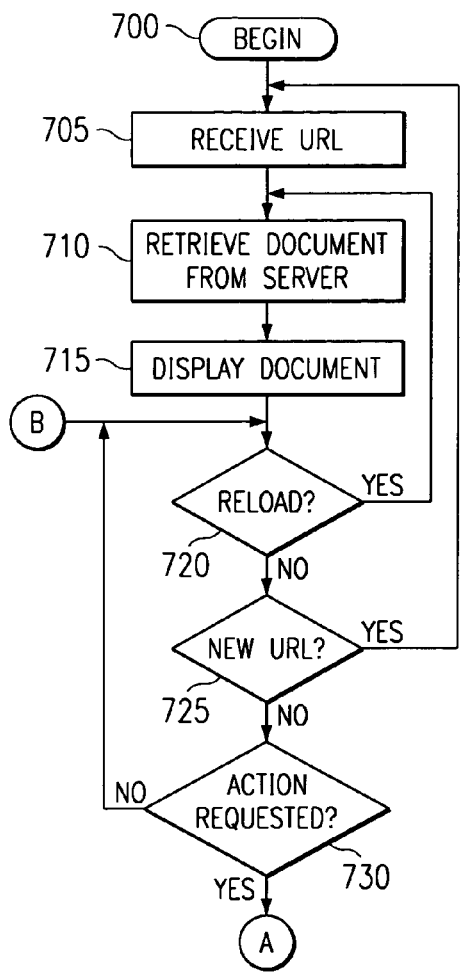
FIGS. 7A and 7B are flowcharts which illustrate the overall process of the present invention.
Figure 7B:
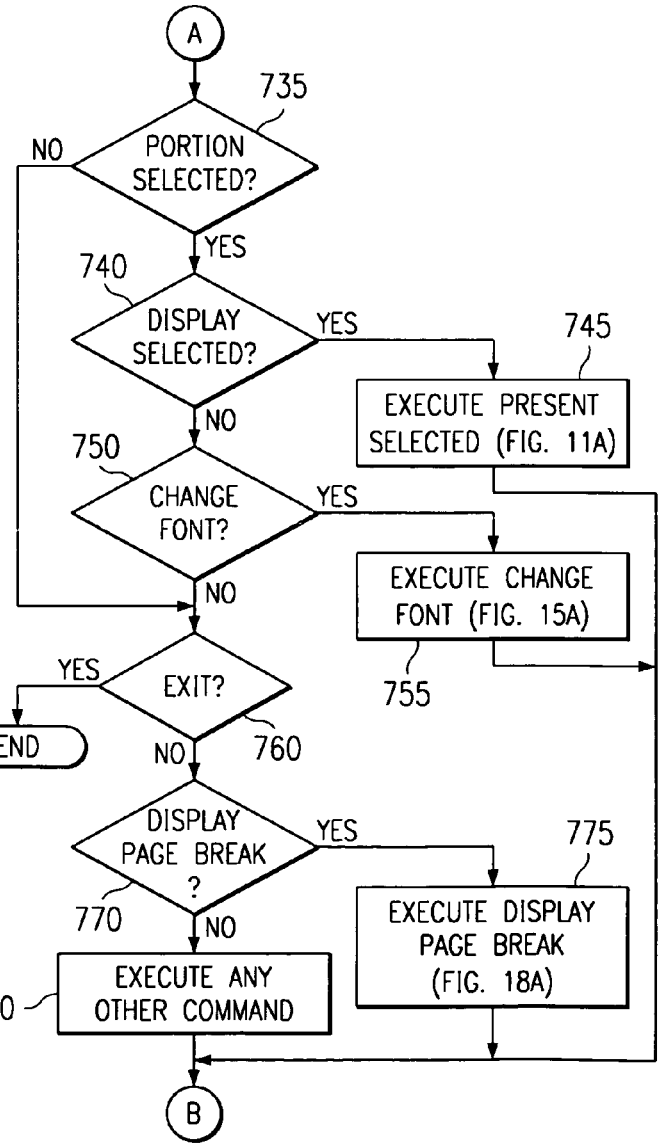

With reference now to FIGS. 7A and 7B, a flowchart of the general operation of a web browser is depicted according to a preferred embodiment of the present invention. The present invention may be implemented in browser 500 shown in FIG. 5, wherein browser 500 provides the functionality of a conventional web browser. However, the web browser of the present invention allows the user to view and print a selected portion of a web page, to change the font size of a selected portion of a web page, and to display page breaks within a web page as they will occur when the web page is printed.

The operation of the program begins (step 700) and receives a URL of a document to be displayed (step 705). When the browser application is initially opened, the URL received is the home page designated by the user to be loaded at startup. A URL may also be received by selection of a "favorite" or "bookmark", selection of the "Back", "Forward", or "Home" buttons, direct entry into an address bar, such as address bar 516, or by other methods, such as links from other applications. When the URL is received, the document is retrieved from the server (step 710) and the document is displayed (step 715).

Next, the process determines whether a "reload" instruction has been received (step 720) by selection of the "reload" button, selection through a menu, or by a keyboard command. If a "reload" instruction has been received, the process returns to step 710 to retrieve the document corresponding to the current URL in the document history. If a "reload" instruction has not been received in step 720, a determination is made whether a new URL has been selected or entered (step 725). If a new URL has been selected or entered, then the process returns to step 705 to receive the URL for document retrieval and display. If a new URL has not been selected or entered in step 720, a determination is made whether an action is requested (step 730). In the depicted example, an action may be any non-navigational command issued by the user, such as "minimize" or a help command. If an action is not requested, the process returns to step 720 to repeat determination as to whether a "reload" instruction, a new URL, or an action request is received.

With reference again to step 730, if an action is requested, a determination is then made whether a portion of the document has been selected (step 735). Typically, a portion of a document is highlighted for selection by operation of a mouse; however, other methods of selecting a portion of a document, such as by means of cursor control keys, menu commands, etc. will be readily apparent to a person of ordinary skill in the art. Commands and instructions are issued to the program by the user through the graphical user interface, i.e. the buttons and menus, keystrokes, and/or a command-line interface, as are known in the art. Other means for allowing a user to issue commands will be readily apparent to a person of ordinary skill in the art. In a preferred embodiment, the right-click capabilities within the Windows operating system will be used to present additional menu choices, such as "Print Selected," "Display Selected," "Increase Font," "Decrease Font," and "Display Page Breaks" when a portion of the document has been selected by highlighting.

If a portion of the document has been selected, a determination is made whether an instruction to present the selected portion of the document (step 740). If an instruction to present the selected portion of the document is received, the program executes the instruction according to a first aspect of the present invention (step 745) and returns to step 720 to determine whether a "reload" instruction has been received. The detailed operation of the presentation of the selected portion of the document according to the first aspect of the present invention will be described in more detail below with respect to FIGS. 11A and 11B.

Referring back to step 740, if an instruction to present the selected portion of the document is not received, a determination is made as to whether an instruction to change the font of the selected portion (step 750). If an instruction to change the font of the selected portion is received, the program executes the instruction according to a second aspect of the present invention (step 755) and returns to step 720 to determine whether a "reload" instruction has been received. The detailed operation of the change of the font of the selected portion of the document according to the second aspect of the present invention will be described in more detail below with respect to FIGS. 15A and 15B.

With reference again to step 735, if a portion of the document has not been selected, a determination is made whether an "exit" instruction has been received (step 760). If an "exit" instruction has been received, operation ends (step 765) and the program closes. If in step 760 an "exit" instruction has not been received, a determination is made whether an instruction has been received to display the document with page break indicators (step 770).

If an instruction has been received to display the document with page break indicators, the program executes the instruction (step 775) according to a third aspect of the invention and returns to step 720 to determine whether a "reload" instruction has been received. The detailed operation of the display of the document with page break indicators according to the third aspect of the present invention will be described in more detail below with respect to FIGS. 18A and 18B.

Referring again to step 770, if an instruction has not been received to display the document with page break indicators, the program proceeds to perform any other action, as with a conventional web browser (step 780). The process then returns to step 720 to determine whether a "reload" instruction has been received. Other actions to be performed may include "minimize" or "save", as mentioned above; however, such actions are not the focus of the current invention and will not be described in further detail.

In accordance with a first aspect of the invention, a user may determine a portion of a document, which is desired for printing. However, due to the complexity of some web documents, it may be difficult for the user to visualize or predict the appearance of the printed output. Therefore, the mechanism of the present invention solves this problem by allowing the user to instruct the web browser to create a document, which contains only the selected portion, and to display the newly created document for subsequent printing.

Figure 8:
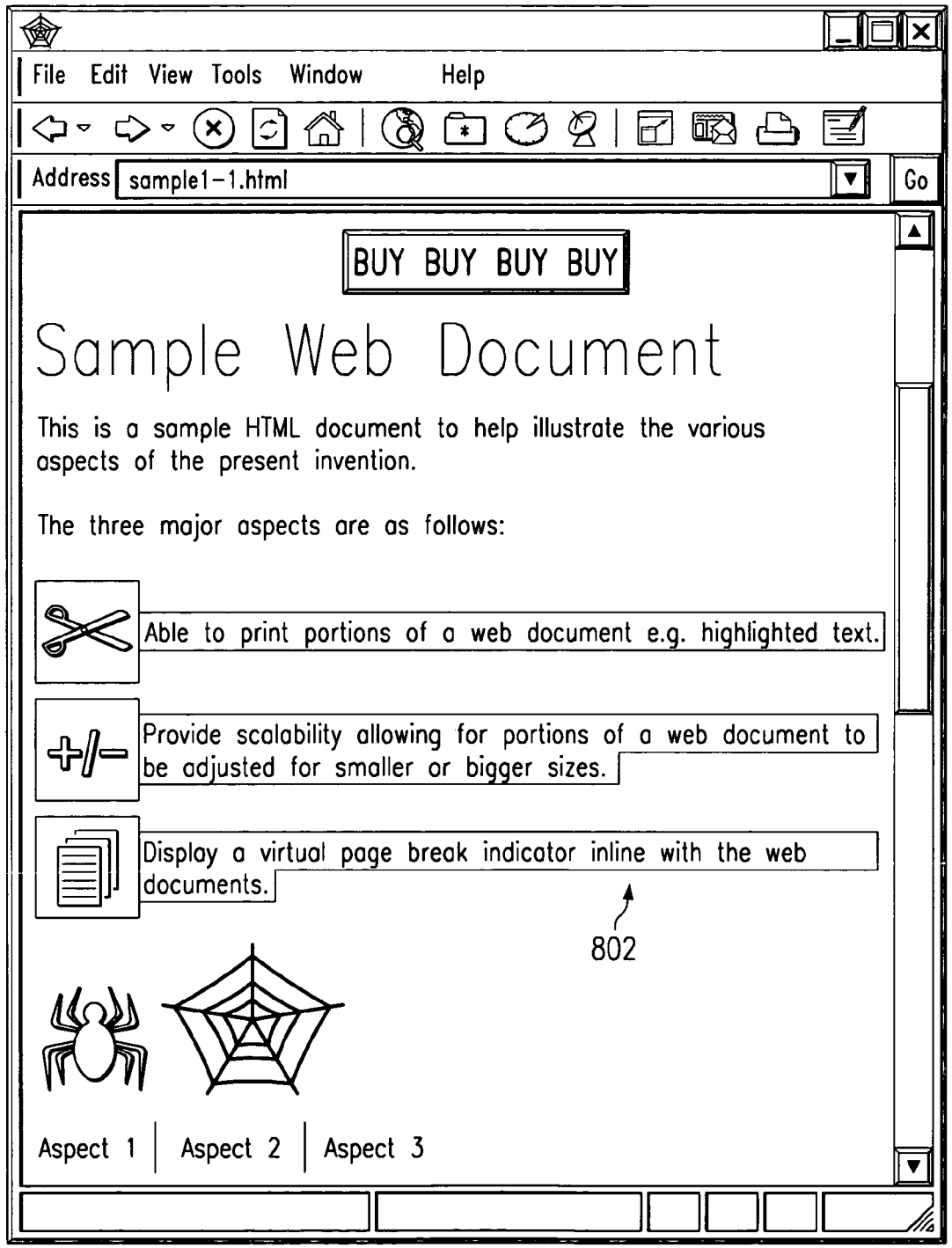
FIG. 8 is an example screen of display of a browser program in which a portion of the document is selected according to a first embodiment of the present invention.
Figure 9:
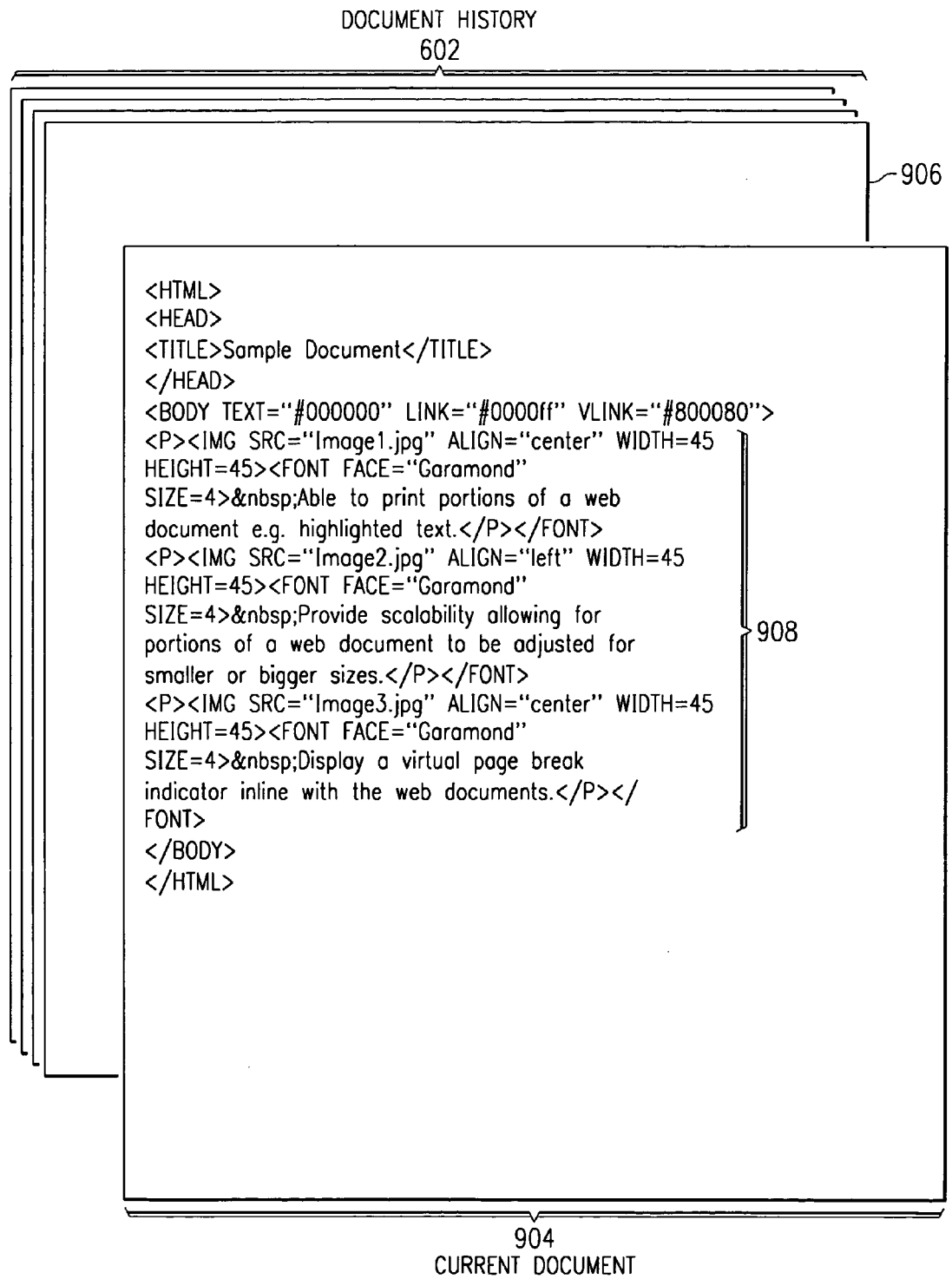
FIG. 9 depicts a document history and an exemplary current document including a selected portion of a document in accordance with a preferred embodiment of the present invention.

Turning now to FIG. 8, a screen of display is shown in which a portion of the document has been selected, as shown by highlighted portion 802. As shown in FIG. 9, the newly created document becomes the current document 904 in document history 902. According to one embodiment of the present invention, the newly created document replaces the current document in the document history 902, but retains the URL identifier. When the user is finished viewing and/or printing the newly created document, the original document may be recovered by issuing a "refresh" or "reload" command. According to an alternate embodiment, the newly created document becomes the current document 904 in the document history 902 and the URL identifier points to the location of the document file in storage, such as a temporary file name. The original document then becomes the previous document 906 in the document history 902. When the user is finished viewing and/or printing the newly created document, the original document may be recovered by issuing a "back" command.

As seen in the example shown in FIG. 8, the selected portion begins with an image, denoted in the HTML document in FIG. 6 as follows:

<IMG SRC="Image1.jpg" ALIGN="center" Width=45 HEIGHT=45>

The selected portion ends with the text "Display a virtual page break indicator inline with the web documents". Therefore, the new document 904 is created by copying the header and any trailer information from the current document 604. The <BODY> and </BODY> tags also are automatically copied from the current document to the newly created document. In the current example, the <BODY> tag includes the following attributes: TEXT="#000000" LINK="#0000ff" VLINK="#800080". All images and text included in the selected portion, as well as any tags which effect any part of the selected portion, are also copied to the newly created document and inserted between the <BODY> and </BODY> tags. For example, as seen in FIG. 6, the image marking the beginning of the selected portion is nested within <P> and </P> tags. Therefore, the beginning <P> tag is included in the newly created document shown in FIG. 9.

Figure 10:
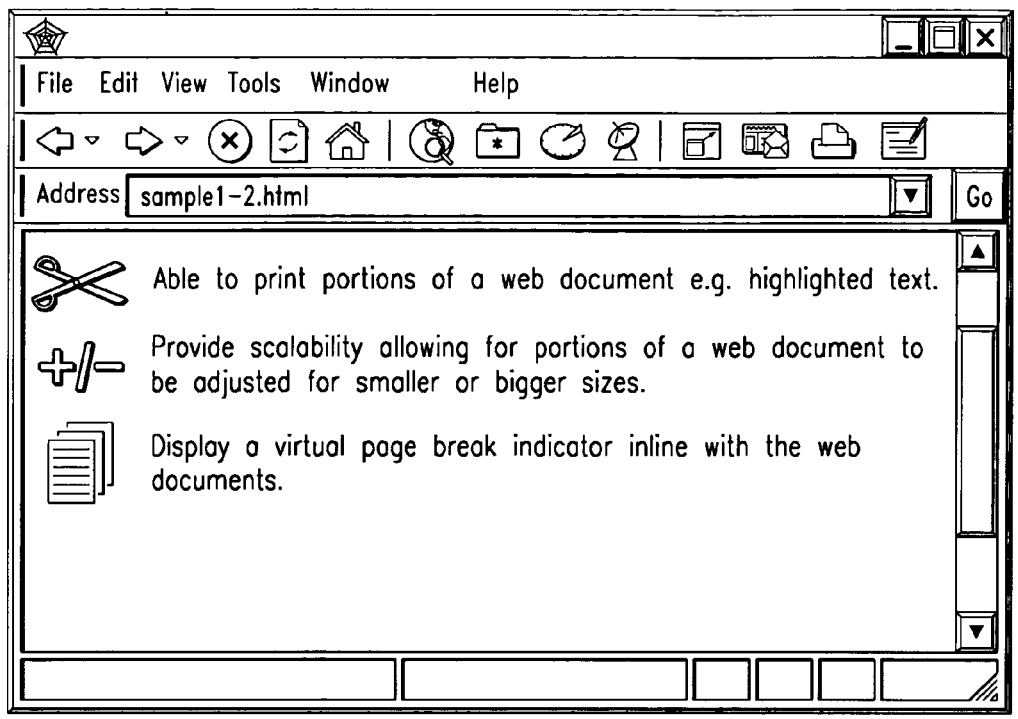
FIG. 10 is an example screen of display of a browser program presenting a selected portion of a document according to a preferred embodiment of the present invention.

In the example shown in FIG. 9, the selected portion and corresponding tags 908 are shown to be inserted between the <BODY> and </BODY> tags. The document, once created is then presented to the user. In a preferred embodiment, the document is presented by display, as shown in FIG. 10. In an alternate embodiment, the newly created document is sent directly to the printer. Other forms of presentation will be readily apparent to one of ordinary skill in the art.

Figure 11A:
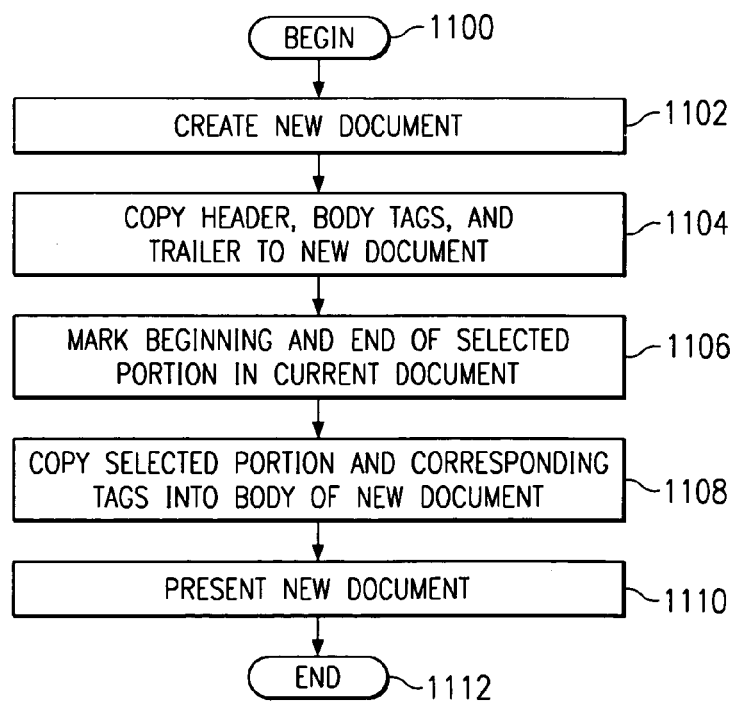
FIGS. 11A and 11B are flowcharts, which illustrates a process for presenting a selected portion of a web page according to a preferred embodiment of the present invention.

With reference now to FIG. 11A, a flowchart of the general operation of a browser program is illustrated according to the first aspect of the present invention. The execution of the instruction to present the selected portion of the document begins (step 1100) and a new document is created (step 1102). The program copies the header, <BODY> and </BODY> tags, and trailer information into the new document (step 1104). The beginning and end of the selected portion are marked in the current document (step 1106). Next, the selected portion and any corresponding tags are copied into the body of the newly created document (step 1108). Then, the newly created document is presented to the user (step 1110) and the execution of the instruction to present the selected portion ends (step 1112).

Figure 11B:
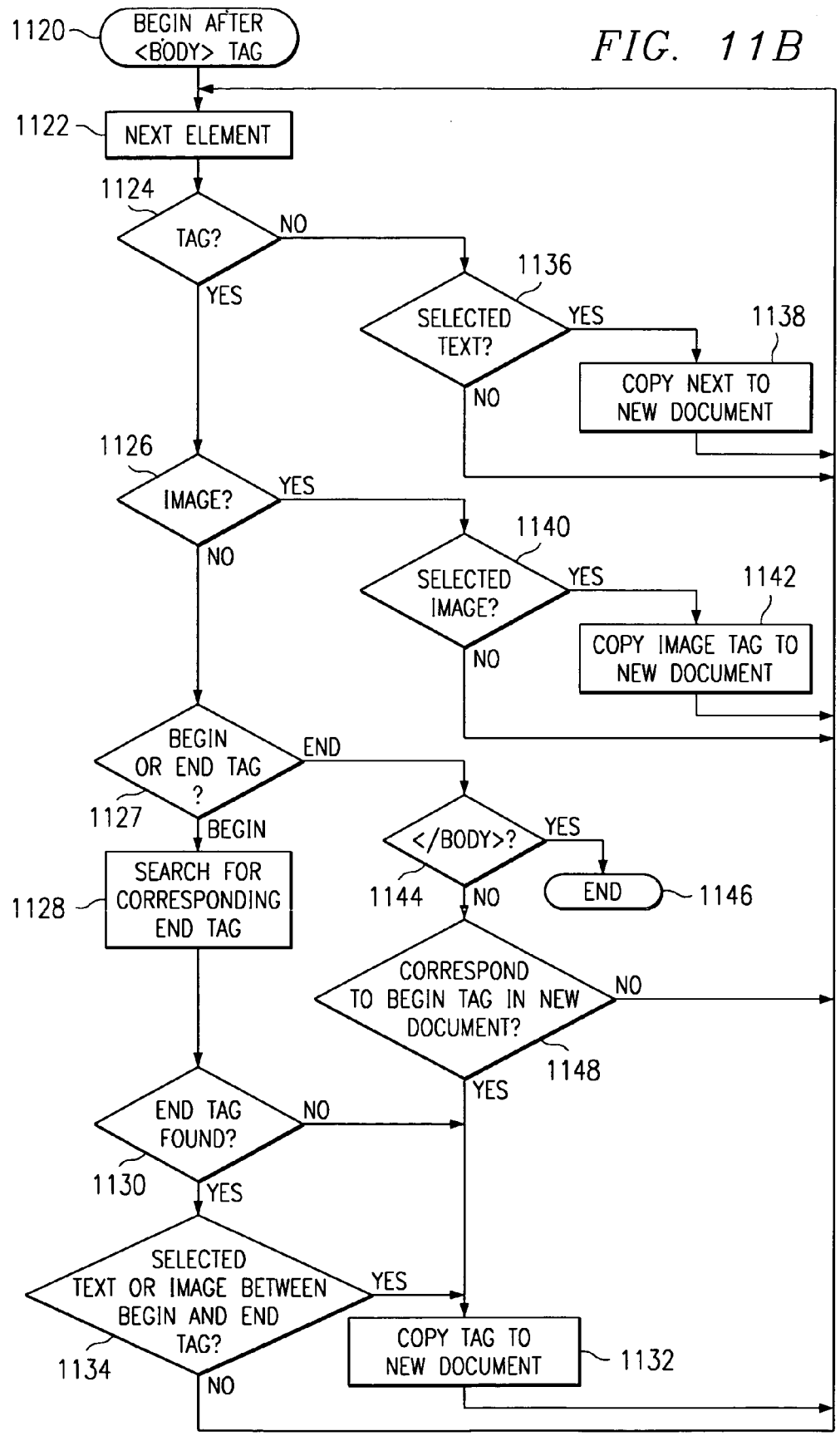

A preferred method of copying the selected portion and corresponding tags into the body of the newly created document, shown as step 1108 in FIG. 11A, is illustrated in FIG. 11B. The process begins at step 1120 after the <BODY> tag in the original document and proceeds to the next element of the document (step 1122).

An element may be a single character or may be a recognized tag or string of text. For example, in the example document in FIG. 6, the <BODY> tag appears as follows:

<BODY TEXT="#000000" LINK="#0000ff" VLINK="#800080"> and the next element is a comment tag <!--Begin Ads-->. It will be understood that comment tags may either be automatically copied to the new document or automatically skipped, because they do not affect the appearance of the web page. Alternatively, a test may be performed to determine whether the tag lies within the selected portion of the document. Although not shown in FIG. 10B, the comment tag is skipped and the next element is the <CENTER> tag.

A determination is made whether the element is a tag (step 1124). If the element is a tag, a determination is made whether the tag is an image tag (step 1126). If the tag is not an image tag in step 1126, a determination is made whether the tag is a beginning tag or an ending tag (step 1127). Ending tags will begin with "</" characters. In a preferred embodiment, any tag that is not an image tag and does not begin with "</" characters will be considered a beginning tag; however, other methods of determining tags may be employed, such as look-up tables of known tags. If the tag is a beginning tag in step 1127, the process searches for a corresponding end tag in the remainder of the document (step 1128) and a determination is made as to whether an end tag is found (step 1130).

If an end tag is not found, the tag is copied to the new document (step 1132). For simplicity, the current example shows that the tag is copied whether it is followed by selected text or images or not. Alternatively, a determination may be made whether the tag is followed by selected text or images, as will be understood by one of ordinary skill in the art. If a beginning tag does not have a corresponding ending tag and is not followed by selected text or images, it may be skipped to avoid extraneous tags that have no effect on the newly created document.

Referring again to step 1130, if an end tag is found, a determination is made whether selected text or images lie between the begin tag and the end tag (step 1134). If selected text or images do lie between the begin tag and the end tag, the process proceeds to step 1132 and the tag is copied to the new document. If selected text or images do not lie between the begin tag and the end tag in step 1134, the begin tag is skipped and the process returns to step 1122 to process the next element.

Referring again to step 1124, if the element is not a tag, the element is assumed to be text as it will appear in the web page. A determination is made whether the element is selected text (step 1136). If it is not selected text, the element is skipped and the process returns to step 1122 to process the next element. The element may be a single character, an entire string of unselected text not including tags, an entire string of selected text not including tags, etc. If the element is selected text in step 1136, the text is copied to the new document (step 1138).

Referring again to step 1126, if the tag is an image, a determination is made whether it is a selected image (step 1140). If it is not a selected image, the element is skipped and the process returns to step 1122 to process the next element of the original document. If the element is a selected image in step 1140, the image tag is copied to the new document (step 1142).

Referring again to step 1127, if the tag is an end tag, a determination is made whether the tag is the </BODY> tag (step 1144). If the tag is the </BODY> tag, then the process has reached the end of the body of the original document and ends (step 1146). If the tag is not the </BODY> tag in step 1144, a determination is made whether the tag has a corresponding begin tag that has been copied to the new document (step 1148). If the end tag does not have a corresponding begin tag that has been copied to the new document, the end tag is skipped and the process returns to step 1122 to process the next element. If it is determined in step 1148 that the end tag does have a corresponding begin tag that has been previously copied to the new document, then the end tag is copied to the new document (step 1132).

In accordance with a second aspect of the invention, the user may determine a text portion of a document, the font size of which is too large or too small to be printed practically or legibly. However, conventional web browsers do not allow a user to modify the font size of only a portion of a document for display and subsequent printing. The present invention solves this problem by allowing the user to instruct the web browser to create a copy of a document, insert font tags to modify the size of only the selected portion, and display the newly created document for subsequent printing.

Figure 12:
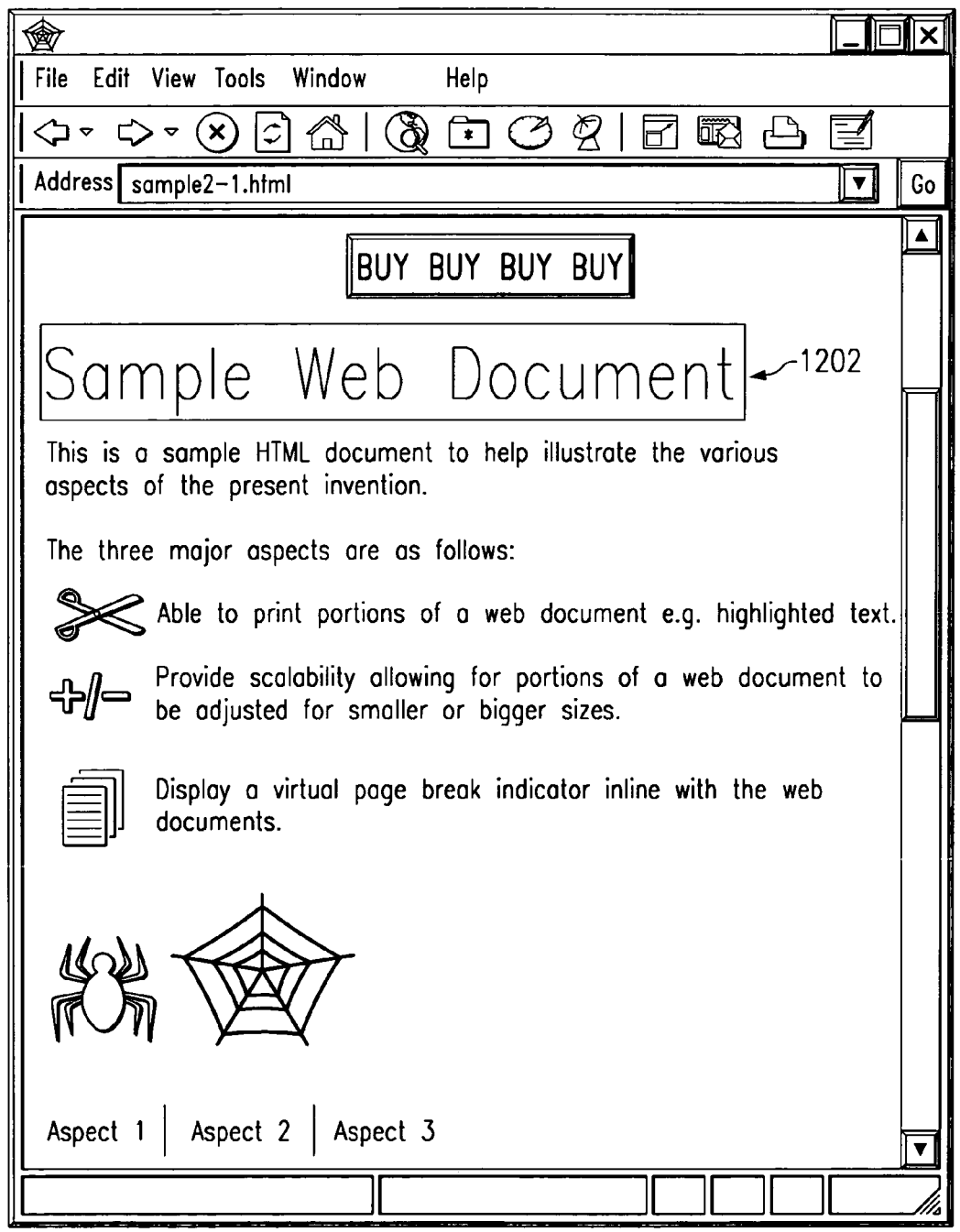
FIG. 12 is an example screen of display of a browser program in which a portion of the document is selected according to a preferred embodiment of the present invention.
Figure 14:
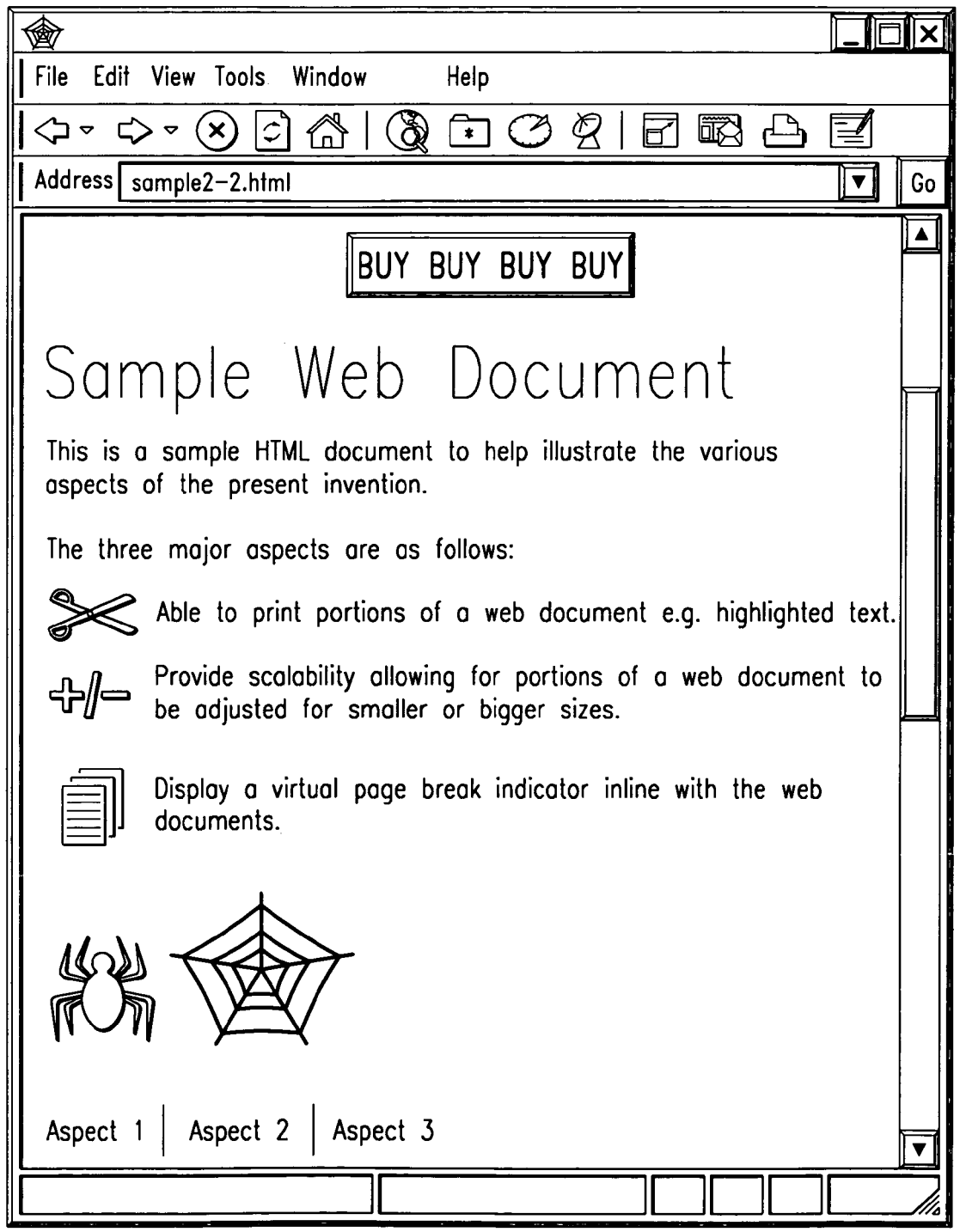
FIG. 14 is an example screen of display of a browser program presenting a document with a modified font attribute for a selected portion of a document according to a second embodiment of the present invention.

Turning now to FIG. 12, a screen of display is shown in which a portion of the document has been selected, as depicted by highlighted portion 1202. As shown in FIG. 13, a copy of the current document becomes the current document 1304 in document history. The font size of the selected portion is adjusted in document 1304 as instructed by the user. As seen in FIG. 12, the selected portion includes the highlighted text "Sample Web Document" 1202. In the HTML document, the highlighted text is surrounded by the font tags <FONT FACE="Garamond" SIZE=7> and </FONT>, as seen in FIG. 13. In this case, since the highlighted text is the only text within the <FONT> and </FONT> tags, the font size is adjusted by changing the SIZE attribute in the tag 1206. If only a portion of the text within the <FONT> and </FONT> tags is selected, the size of the selected text would be adjusted by adding <FONT SIZE=X> and </FONT> tags before and after the selected text, respectively, where "X" is the adjusted size. If the <FONT> tag does not have a SIZE attribute or if a portion of the selected text is not nested within <FONT> and </FONT> tags, <FONT SIZE=+1> and </FONT> tags are added for an increase in font size and <FONT SIZE=−1> and </FONT> tags are added for a decrease in font size. If the selected text is broken up by a plurality of font tags, then each substring within the selected portion will be adjusted independently based on its respective font tag. FIG. 14 shows a screen of display in which a representative document generated by the second aspect of the invention is presented.

Figure 15A:
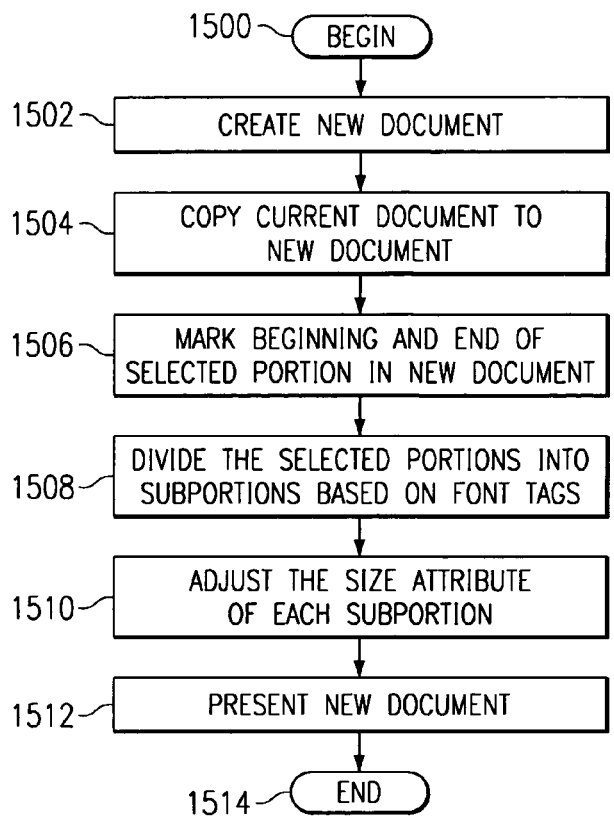
FIGS. 15A and 15B are flowcharts, which illustrates a process for changing a font size of a selected portion of a web page according to a preferred embodiment of the present invention.

With reference now to FIG. 15A, a flowchart of the general operation of a browser program is depicted according to the second aspect of the present invention. The execution of the instruction to change font size for selected portion of the document begins (step 1500) and a new document is created (step 1502). The program copies the current document to the newly created document (step 1504). The beginning and end of the selected portion are marked in the newly created document (step 1506) and the selected portion is divided into one or more subportions based on different uses of font tags within the selected portion (step 1508). The program adjusts the size of each subportion (step 1510). Then, the new document is displayed to the user (step 1512) and instruction to change font size for the selected portion ends (step 1514).

Figure 15B:
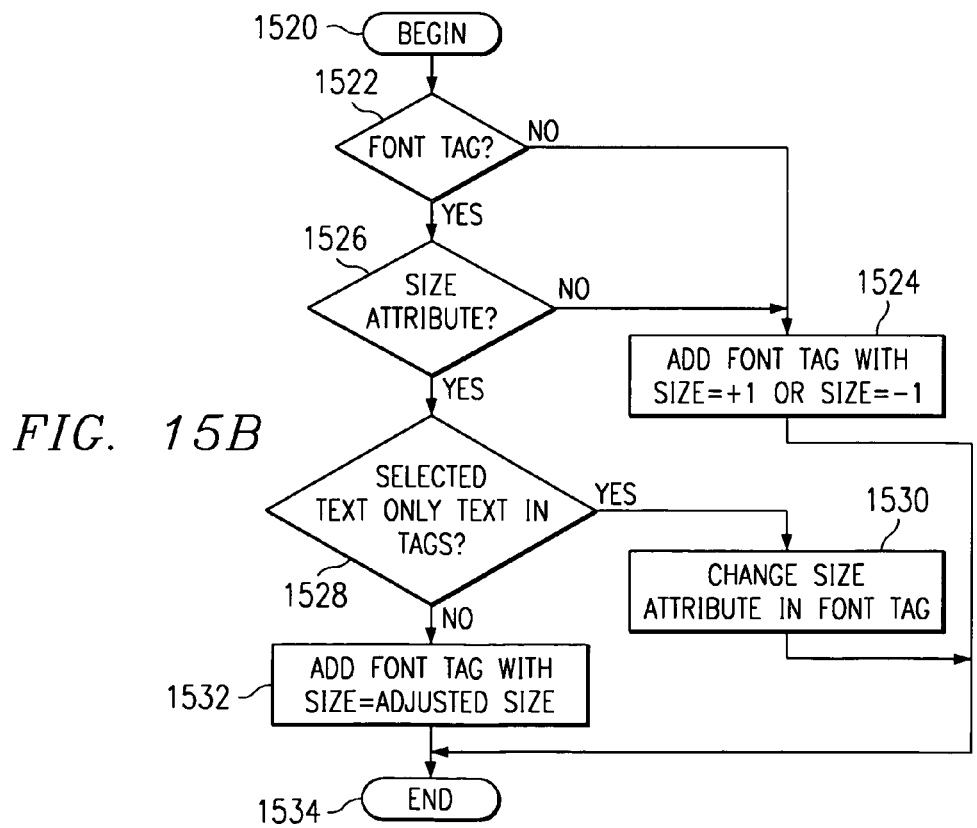

With respect to FIG. 15B, a flowchart shows general operation of adjusting the font size for each subportion, shown as step 1510 in FIG. 15A is illustrated in accordance with a preferred embodiment of the present invention. Execution begins (step 1520) and a determination is made whether the subportion is surrounded by font tags (step 1522). If the subportion is not surrounded by font tags, then <FONT SIZE=+1> and </FONT> tags or <FONT SIZE=−1> and </FONT> tags are added before and after the subportion of text, depending on the instruction from the user and execution ends (step 1534). If the subportion is surrounded by font tags in step 1522, a determination is made whether the font tag includes a size attribute (step 1526). If the font tag does not include a size attribute, then <FONT SIZE=+1> and </FONT> tags or <FONT SIZE=−1> and </FONT> tags are added before and after the subportion of text, depending on the instruction from the user, and execution ends (step 1534).

If the font tag does include a size attribute in step 1526, a determination is made whether the selected text is the only text between the font tags (step 1528). If the selected text is the only text between the font tags, then the size attribute in the font tag is increased or decreased by one depending on the instruction from the user (step 1530), and execution ends (step 1534).

If the selected text is not the only text between the font tags in step 1528, then <FONT SIZE=X> and </FONT> tags are added before and after the selected text, where X is the adjusted size, and execution ends (step 1534).

As will be understood, the present invention is not limited to changing the font size, as described above. The present invention may be used to change any attribute associated with the font of the selected portion. For example, the web browser may be configured to allow the user to select a portion of a document and issue an instruction to change the font face, color, or other attribute.

In accordance with a third aspect of the invention, the user may wish to view the web document as it will appear in printed form. However, conventional web browsers only allow a user to preview a document for subsequent printing. This feature is called a "Print Preview" function. However, the "Print Preview" display is often difficult to read and does not act as a web page. Therefore, the present invention solves this problem by allowing the user to instruct the web browser to create a copy of a document, insert page break indicator tags to indicate the locations of page breaks, and display the newly created document for subsequent printing.

An example document created by the invention is shown in FIG. 16. In response to instruction from the user, document 1604 is created with page break indicator tags 1606 inserted at the appropriate location. The page break indicator is inserted as plain, preformatted text to be displayed in the web page. The text is surrounded by <CENTER> and </CENTER> tags and comment tags, such as tags <!--Begin Page Break--> and <!--End Page Break-->. The comment tags are used to mark the page breaks for deletion before printing.

Referring again to FIG. 3, web browser 308 sends the original web document, along with the appropriate instructions, to the printer device driver 314 or other device driver 312 through operating system 302 and I/O manager 310. The instructions may take the form of an API call. An example call may be as follows: req_page_break_info(document, count, page_info), where "document" is the web document itself; "count" is the number of pages in the web document to be supplied by the printer device driver; and, "page_info" is an input and output parameter, the input parameter being the "page setup" information and the output from the printer driver is the locations where page breaks should lie. The "page setup" information includes settings within the application, such as margins, paper size, and paper orientation.

Figure 17:
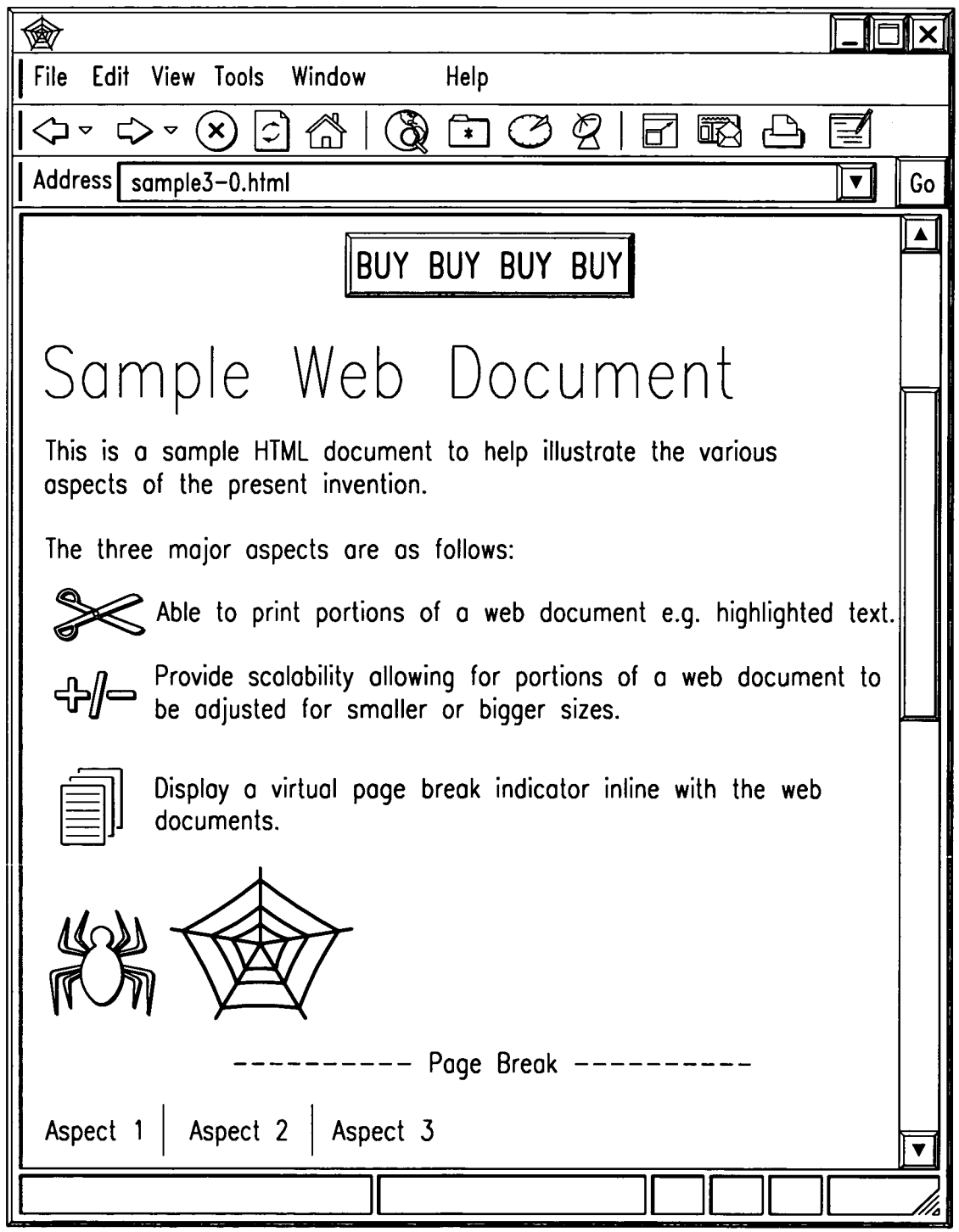
FIG. 17 is an example screen of display of a browser program presenting a document with a page break indicator according to a preferred embodiment of the present invention; and, FIGS. 18A and 18B are flowcharts, which illustrate a process for displaying a web page with page break indicators, according to a preferred embodiment of the present invention.

According to an alternate embodiment of the present invention, the web browser application can estimate the locations of page breaks using the "page setup" information, sizes of fonts, sizes of images, etc. However, characteristics of printers vary and the printed pages will not always appear as estimated. For example, due to differences in printer characteristics (e.g., resolution), a page printed on a dot matrix printer will appear different from a page printed on a laser printer, particularly where line breaks and page breaks lie. Therefore, receiving the page break information from the printer driver is more reliable. FIG. 17 illustrates an example screen of display according to a preferred embodiment of the present invention.

Figure 18A:
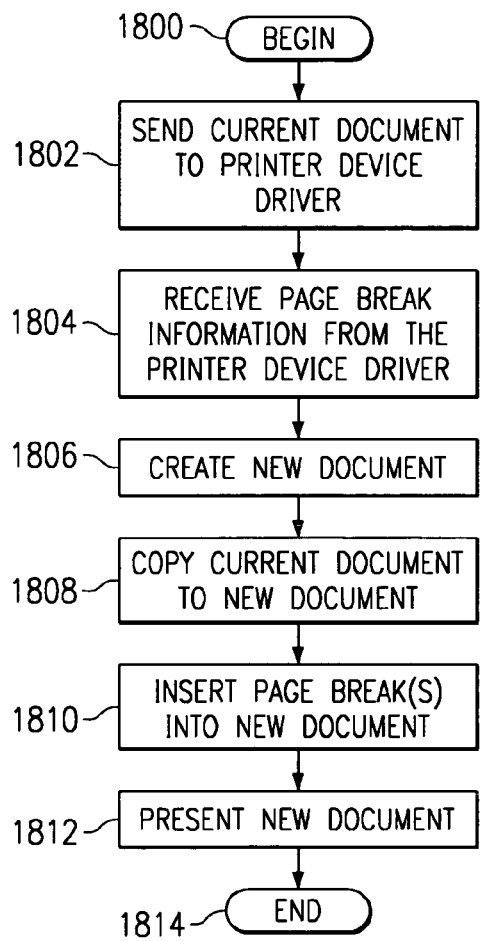

Turning now to FIG. 18A, a flowchart of the general operation of the page break display feature is depicted in accordance with a preferred embodiment of the present invention. The process begins (step 1800) and the current document is sent to the printer device driver (step 1802). Page break and page count information is received from the printer device driver (step 1804). Then, a new document is created (step 1806) and the current document is copied to the new document (step 1808). Page break indicators are inserted into the newly created document (step 1810). Next, the new document is presented to the user (step 1812) and the process ends (step 1814).

Figure 18B:
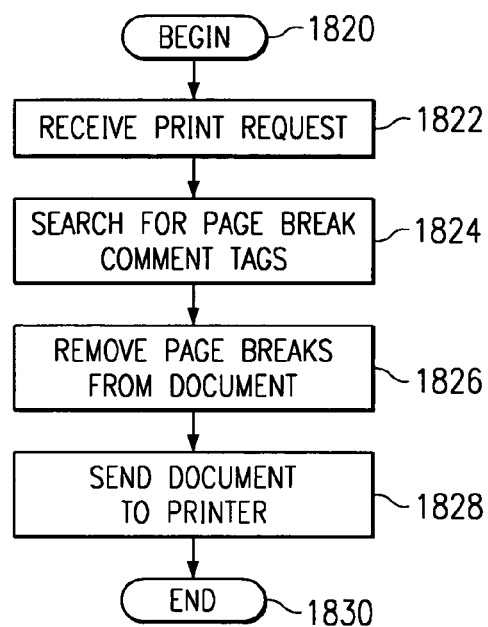

With respect to FIG. 18B, a flowchart shows the general operation of the deletion of page break indicators when printing a document. The process begins at step 1820, and a print request is received (step 1822). The process searches for page break comment tags (step 1824) and removes page break indicators from the document when they are found (step 1826). The document is then sent to the printer (step 1828) and the process ends (step 1830).

According to an alternate embodiment of the present invention, the step of removing page break indicators from the document (step 1826) may include the insertion of forced page breaks in the place of the page break indicators. By forcing page breaks at the time of printing, the present invention prevents partial printing of lines of text or images at bottoms of printed pages.

The present invention allows a user to display and print a selected portion of a web page, to change font attributes of a selected portion of a web page, and to display a web page with an indication of where the page breaks will occur and how many pages there are in the document in a web browser without employing a word processor or web page editor application. Switching between a web browser and a word processor is cumbersome and time consuming. Word processors consume memory with complex software, which is unnecessary for the simple tasks of printing and changing the font properties of a portion of a web document. Furthermore, word processors do not include many of the features for which web browsers were designed, such as seamless navigation between pages, executing Java applets, managing and executing plug-in applications, executing CGI scripts, etc. The present invention provides added printing functionality without requiring explicit, burdensome steps to be performed by the user and without loss of web browser functionality.

It will be recognized that the aspects of the present invention may be used in conjunction with one another to provide more control over the presentation of a web page. For example, a user may select a portion of a web page to eliminate the presentation of banner advertisements. Then, the user may select a portion of the resulting display and instruct the program to change the size of the font of the selected text. The user may then instruct the program to display page breaks within the resulting page. Each time the user issues an instruction, a new page is created and the previous page remains on the web server, is discarded, or becomes part of the document history.

It is important to note that while the present invention has been described in the context of a fully functioning data processing system, those of ordinary skill in the art will appreciate that the processes of the present invention are capable of being distributed in the form of a computer readable medium of instructions for execution by a data processing system and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a web browser on a data processing system for processing a document, the method comprising:
   receiving a first web document including formatting information used to display the first web document;
   receiving a request to present a selected portion of the first web document;
   identifying formatting information associated with the selected portion of the first web document;
   creating in the web browser a second web document including the selected portion and the formatting information associated with the selected portion, in response to receiving the request, wherein the first web document and the second web document are markup language documents;
   responsive to a request to change a font attribute of the selected portion, inserting virtual font indicators before and after text within the selected portion; and
   responsive to a request to identify a page break in the selected portion, inserting at least one virtual page break indicator within the selected portion, wherein identifying the page break in the selected portion comprises identifying a location of the page break based on page setup information, document formatting information, and document content.

2. The method of claim 1, further comprising sending the second web document to an output device.

3. The method of claim 2, wherein the output device is a printer.

4. The method of claim 2, wherein the output device is a display device.

5. The method of claim 1, further comprising:
receiving a request to change a font attribute of a selected portion of the second web document; and
creating in the web browser a third web document from the second web document, wherein the font attribute, within the third web document, of the selected portion is changed in response to receiving the request to change the font attribute of the selected portion.

6. The method of claim 5, further comprising:
receiving a request to display page break indicators within the third web document;
identifying page break information for the third web document for an output device; and
creating in the web browser a fourth web document from the third web document, wherein at least one virtual page break indicator is inserted into the fourth web document, in response to the page break information, to indicate the location of page breaks.

7. The method of claim 1, further comprising:
receiving a request to display page break indicators within the second web document;
identifying page break information for the second web document for an output device; and
creating in the web browser a third web document from the second web document, wherein at least one virtual page break indicator is inserted into the third web document, in response to the page break information, to indicate the location of page breaks.

8. The method of claim 1, wherein the formatting information includes tags.

9. The method of claim 1, wherein the markup language is hypertext markup language.

10. The method of claim 9, wherein the formatting information includes hypertext markup language tags.

11. The method of claim 9, wherein the formatting information includes a header.

12. A method in a web browser on a data processing system for processing a document, said method comprising:
receiving a first web document;
receiving a request to change a font attribute of a selected portion of the first web document;
receiving a request to identify a page break in the selected portion of the first web document; and
creating in the web browser a second web document from the first web document, wherein the font attribute, within the second web document, of the selected portion is changed in response to receiving the request to change the font attribute of the selected portion, wherein at least one virtual page break indicator is inserted within the selected portion in response to receiving the request to identify a page break in the selected portion, wherein identifying the page break comprises identifying a location of the page break based on page setup information, document formatting information, and document content, and wherein the first web document and the second web document are markup language documents.

13. The method of claim 12, wherein the step of creating the second web document includes inserting virtual font indicators before and after text within the selected portion.

14. The method of claim 13, further comprising sending the second web document to an output device.

15. The method of claim 14, wherein the output device is a display device, the selected portion being displayed according to the virtual font indicators.

16. The method of claim 14, wherein the output device is a printer, the selected portion being printed according to the virtual font indicators.

17. The method of claim 13, wherein the virtual font indicators include tags.

18. The method of claim 13, wherein the markup language is hypertext markup language.

19. The method of claim 18, wherein the virtual font indicators include hypertext markup language tags.

20. The method of claim 12, further comprising identifying at least one font indicator associated with text within the selected portion of the first web document, wherein the step of creating the second web document includes modifying the font attribute of the associated at least one font indicator.

21. The method of claim 20, further comprising sending the second web document to an output device.

22. The method of claim 21, wherein the output device is a display device, the selected portion being displayed according to the modified at least one font indicator.

23. The method of claim 21, wherein the output device is a printer, the selected portion being printed according to the modified at least one font indicator.

24. The method of claim 20, wherein the at least one font indicator includes a tag.

25. The method of claim 20, wherein the markup language is hypertext markup language.

26. The method of claim 25, wherein the at least one font indicator includes a hypertext markup language tag.

27. The method of claim 12, wherein the step of creating the second web document comprises creating a copy of the first web document and changing the font attribute of the selected portion within the copy of the first web document.

28. The method of claim 12, wherein the step of creating the second web document comprises changing the font attribute of the selected portion within the first web document to create the second web document.

29. A method in a web browser on a data processing system for processing a document, the method comprising:
receiving a first web document;
receiving a request to change a font attribute within the first document;
receiving a request to display page break indicators within the first web document;
identifying page break information for the first web document for an output device; and
creating in the web browser a second web document from the first web document, wherein virtual font indicators are inserted into the second web document before and after text within the second web document, wherein at least one virtual page break indicator is inserted into the second web document, in response to the page break information, to indicate the location of page breaks, wherein the first web document and the second web document are markup language documents, and wherein identifying the page break information comprises identifying a location of the page break based on page setup information, document formatting information, and document content.

30. The method of claim 29, further comprising:
removing the at least one virtual page break indicator; and
printing the second web document.

31. The method of claim 29, further comprising:
replacing the at least one virtual page break indicator with at least one forced page break; and
printing the second web document.

32. The method of claim 29, further comprising sending the second web document to the output device.

33. The method of claim 32, wherein the output device is a printer.

34. The method of claim 32, wherein the output device is a display device.

35. The method of claim 29, wherein the at least one virtual page break indicator includes a tag.

36. The method of claim 29, wherein the markup language is hypertext markup language.

37. The method of claim 36, wherein the at least one virtual page break indicator includes a hypertext markup language tag.

38. The method of claim 29, wherein the step of creating the second web document comprises creating a copy of the first web document and inserting at least one virtual page break indicator into the copy of the first web document.

39. The method of claim 29, wherein the step of creating the second web document comprises inserting the at least one virtual page break indicator into the first web document to create the second web document.

40. The method of claim 29, wherein the step of identifying page break information comprises sending the first web document to a device driver and receiving page break information corresponding to the first web document from the device driver.

41. The method of claim 29, wherein the device driver is a printer driver.

42. An apparatus for processing a document, comprising:
receiving means for receiving a first web document including formatting information used to display the first web document;
receiving means for receiving a request to present a selected portion of the first web document;
identifying means for identifying formatting information associated with the selected portion of the first web document;
creating means for creating in a web browser a second web document consisting of the selected portion and the formatting information associated with the selected portion in response to receiving the request, wherein the first web document and the second web document are markup language documents;
responsive to a request to change a font attribute of the selected portion, inserting means for inserting virtual font indicators before and after text within the selected portion; and
responsive to a request to identify a page break in the selected portion, inserting means for inserting at least one virtual page break indicator within the selected portion, wherein identifying the page break comprises identifying a location of the page break based on page setup information, document formatting information, and document content.

43. The apparatus of claim 42, further comprising means for displaying the second web document.

44. The apparatus of claim 42, further comprising means for printing the second web document.

45. The apparatus of claim 42, further comprising:
means for receiving a request to change a font attribute of a selected portion of the second web document; and
means for creating a third web document from the second web document, wherein the font attribute of the selected portion within the third web document is changed in response to receiving the request to change the font attribute of the selected portion.

46. The apparatus of claim 42, further comprising:
means for receiving a request to display page break indicators within the second web document;
means for identifying page break information for the second web document for an output device; and
means for creating a third web document from the second web document, wherein at least one virtual page break indicator is inserted into the third web document, in response to the page break information, to indicate the location of page breaks.

47. An apparatus for processing a document, comprising:
receiving means for receiving a first web document;
receiving means for receiving a request to change a font attribute of a selected portion of the first web document;
receiving means for receiving a request to identify a page break in the selected portion; and
creating means for creating in a web browser a second web document from the first web document, wherein the font attribute of the selected portion within the second web document is changed in response to receiving the request to change the font attribute of the selected portion, wherein at least one virtual page break indicator is inserted within the selected portion in response to receiving the request to identify a page break in the selected portion, wherein identifying the page break comprises identifying a location of the page break based on page setup information document formatting information, and document content, and wherein the first web document and the second web document are markup language documents.

48. The apparatus of claim 47, wherein the creating means comprises means for inserting virtual font indicators before and after text within the selected portion.

49. The apparatus of claim 48, further comprising means for displaying the second web document, the selected portion being displayed according to the virtual font indicators.

50. The apparatus of claim 48, further comprising means for printing the second web document, the selected portion being printed according to the virtual font indicators.

51. The apparatus of claim 47, further comprising means for identifying at least one font indicator associated with text within the selected portion of the first web document, wherein the creating means comprises means for modifying the font attribute of the associated at least one font indicator.

52. The apparatus of claim 51, further comprising means for displaying the second web document, the selected portion being displayed according to the at least one modified font indicator.

53. The apparatus of claim 51 further comprising means for printing the second web document, the selected portion being printed according to the at least one modified font indicator.

54. An apparatus for processing a document, comprising:
receiving means for receiving a first web document;
receiving means for receiving a request to change a font attribute within the first document;
receiving means for receiving a request to display page break indicators within the first web document;
identifying means for identifying page break information for the first web document for an output device; and
creating means for creating in a web browser a second web document from the first web document, wherein virtual font indicators are inserted into the second web document before and after text within the second web document, wherein at least one virtual page break indicator is inserted into the second web document, in response to the page break information, to indicate the location of page breaks, wherein the first web document and the second web document are markup language documents, and wherein identifying the page break information comprises identifying a location of the page break based on page setup information, document formatting information, and document content.

55. The apparatus of claim 54, further comprising:
removing means for removing the at least one virtual page break indicator; and
printing means for printing the second web document.

56. The apparatus of claim 54, further comprising:
replacing means for replacing the at least one virtual page break indicator with at least one forced page break; and
printing means for printing the second web document.

57. The apparatus of claim 54, further comprising means for displaying the second web document.

58. A computer program product in a computer readable medium for processing a document, the computer program product comprising:
instruction means for receiving a first web document including formatting information used to display the first web document;
instruction means for receiving a request to present a selected portion of the first web document;
instruction means for identifying formatting information associated with the selected portion of the first web document;
instruction means for creating in a web browser a second web document consisting of the selected portion and the associated formatting information in response to receiving the request, wherein the first web document and the second web document are markup language documents;
responsive to a request to change a font attribute of the selected portion, instruction means for inserting virtual font indicators before and after text within the selected portion; and
responsive to a request to identify a page break in the selected portion, instructions for inserting at least one virtual page break indicator within the selected portion, wherein identifying the page break comprises identifying a location of the page break based on page setup information, document formatting information, and document content.

59. A computer program product in a computer readable medium for processing a document, the computer program product comprising:
instruction means for receiving a first web document;
instruction means for receiving a request to change a font attribute of a selected portion of the first web document;
instructions for receiving a request to identify a page break in the selected portion; and
instruction means for creating in a web browser a second web document from the first web document, wherein the font attribute of the selected portion within the second web document is changed in response to receiving the request to change the font attribute of the selected portion, wherein at least one virtual page break indicator is inserted within the selected portion in response to receiving the request to identify a page break in the selected portion, wherein identifying the page break comprises identifying a location of the page break based on page setup information, document formatting information, and document content, and wherein the first web document and the second web document are markup language documents.

60. A computer program product in a computer readable medium for processing a document, the computer program product comprising:
instruction means for receiving a first web document;
instruction means for receiving a request to change a font attribute within the first document;
instruction means for receiving a request to display page break indicators within the first web document;
instruction means for identifying page break information corresponding to the first web document; and
instruction means for creating in a web browser a second web document from the first web document, wherein virtual font indicators are inserted into the second web document before and after text within the second web document, wherein at least one virtual page break indicator is inserted into the second web document, in response to the page break information, to indicate the location of page breaks, wherein the first web document and the second web document are markup language documents, and wherein identifying the page break information comprises identifying a location of the page break based on page setup information, document formatting information, and document content.

61. A computer system having stored therein a web browser application, the system comprising:
interface means for allowing the user to interface with the web browser application;
communication means for receiving a first web document from a network;
creation and editing means for creating a second web document, wherein the creation and editing means has a plurality of modes of operation including:
a first mode of operation in which the creation and editing means receives a request from the interface means to present a selected portion of the first web document, identifies formatting information associated with the selected portion of the first web document, and creates in the web browser a second web document consisting of the selected portion and the associated formatting information in response to receiving the request;
a second mode of operation in which the creation and editing means receives a request from the interface means to change a font attribute of a selected portion of the first web document, and creates in the web browser a second web document from the first web document, wherein the font attribute of the selected portion within the second web document is changed in response to receiving the request to change the font attribute of the selected portion; and
a third mode of operation in which the creation and editing means receives a request from the interface means to display page break indicators within the first web document, identifies page break information corresponding to the first web document, and creates in the web browser a second web document from the first web document, wherein at least one virtual page break indicator is inserted into the second web document, in response to the page break information, to indicate the location of page breaks, wherein the first web document and the second web document are markup language documents, and wherein identifying the page break information comprises identifying a location of the page break based on page setup information, document formatting information, and document content.

* * * * *